United States Patent
Min et al.

(10) Patent No.: US 10,277,783 B2
(45) Date of Patent: Apr. 30, 2019

(54) METHOD AND DEVICE FOR IMAGE DISPLAY BASED ON METADATA, AND RECORDING MEDIUM THEREFOR

(71) Applicant: SAMSUNG ELECTRONICS CO., LTD., Suwon-si (KR)

(72) Inventors: Byung-seok Min, Seoul (KR); Dong-hyun Kim, Seongnam-si (KR); Seung-hoon Han, Suwon-si (KR); Ho-cheon Wey, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/526,603

(22) PCT Filed: Jun. 1, 2015

(86) PCT No.: PCT/KR2015/005490
§ 371 (c)(1),
(2) Date: May 12, 2017

(87) PCT Pub. No.: WO2016/076497
PCT Pub. Date: May 19, 2016

(65) Prior Publication Data
US 2017/0324887 A1 Nov. 9, 2017

Related U.S. Application Data

(60) Provisional application No. 62/079,812, filed on Nov. 14, 2014.

(51) Int. Cl.
*H04N 1/60* (2006.01)
*H04N 5/93* (2006.01)
(Continued)

(52) U.S. Cl.
CPC ............. *H04N 1/6066* (2013.01); *G06T 3/40* (2013.01); *H04N 1/6052* (2013.01); *H04N 5/93* (2013.01);
(Continued)

(58) Field of Classification Search
CPC ...... H04N 1/6066; H04N 1/6052; H04N 9/67; H04N 2201/3259; H04N 5/93; H04N 9/64; G06T 3/40
See application file for complete search history.

(56) References Cited

U.S. PATENT DOCUMENTS

| | | | |
|---|---|---|---|
| 7,177,465 B1 * | 2/2007 | Takahira | H04N 1/6058 358/1.9 |
| 8,675,010 B2 | 3/2014 | Cho et al. | |

(Continued)

FOREIGN PATENT DOCUMENTS

| | | |
|---|---|---|
| CN | 1537304 A | 10/2004 |
| CN | 1722773 A | 1/2006 |

(Continued)

OTHER PUBLICATIONS

International Search Report and Written Opinion (PCT/ISA/210 & PCT/ISA/237) dated Aug. 21, 2015 issued by the Int. Searching Authority in counterpart Application No. PCT/KR2015/005490.

(Continued)

*Primary Examiner* — Maurice L. McDowell, Jr.
(74) *Attorney, Agent, or Firm* — Sughrue Mion, PLLC

(57) ABSTRACT

A method of generating metadata includes: obtaining a first image and a second image respectively having different color gamuts; obtaining at least one of information regarding a white point and information regarding the color gamut of the second image; correcting the first image based on the obtained information; and generating the metadata based on a correspondence relation between color information of the (Continued)

corrected first image and color information of the second image.

16 Claims, 9 Drawing Sheets

(51) Int. Cl.
*H04N 9/64* (2006.01)
*G06T 3/40* (2006.01)
*H04N 9/67* (2006.01)

(52) U.S. Cl.
CPC ............ *H04N 9/64* (2013.01); *H04N 9/67* (2013.01); *H04N 2201/3259* (2013.01)

(56) References Cited

U.S. PATENT DOCUMENTS

| | | | |
|---|---|---|---|
| 8,731,287 B2 | 5/2014 | Su et al. | |
| 8,743,291 B2 | 6/2014 | Li et al. | |
| 9,083,922 B2 | 7/2015 | Doser et al. | |
| 9,224,363 B2 | 12/2015 | Ballestad et al. | |
| 9,854,136 B2 | 12/2017 | Doser et al. | |
| 2003/0234794 A1 | 12/2003 | Kanai | |
| 2005/0280851 A1 | 12/2005 | Kim et al. | |
| 2010/0246979 A1* | 9/2010 | Guarnieri | G06T 3/40 |
| | | | 382/219 |
| 2013/0076763 A1* | 3/2013 | Messmer | H04N 1/6058 |
| | | | 345/506 |
| 2013/0169662 A1 | 7/2013 | Yun et al. | |

FOREIGN PATENT DOCUMENTS

| | | |
|---|---|---|
| CN | 102044230 A | 5/2011 |
| CN | 102209179 A | 10/2011 |
| CN | 103187022 A | 7/2013 |
| EP | 2 610 842 A2 | 7/2013 |
| JP | 8-46989 A | 2/1996 |
| JP | 2010-524025 A | 7/2010 |
| KR | 10-2007-0105214 A | 10/2007 |
| KR | 10-2008-0106547 A | 12/2008 |
| KR | 10-2011-0111251 A | 10/2011 |
| KR | 10-2014-0129377 A | 11/2014 |
| WO | 2014/128586 A1 | 8/2014 |
| WO | 2014/130343 A2 | 8/2014 |

OTHER PUBLICATIONS

Communication dated Oct. 27, 2017 by the European Patent Office in counterpart European Patent Application No. 15858627.1.
Communication dated Jun. 27, 2018, issued by the State Intellectual Property Office of the People's Republic of China in counterpart Chinese Application No. 201580071638.7.
Communication Nov. 26, 2018 issued by the Korean Intellectual Property Office in counterpart Korean Patent Application No. 10-2017-7012959.

* cited by examiner

900

1000

METHOD AND DEVICE FOR IMAGE DISPLAY BASED ON METADATA, AND RECORDING MEDIUM THEREFOR

TECHNICAL FIELD

The inventive concept relates to a method and a device for displaying an image based on metadata, and more particularly, to a method and a device for generating metadata for displaying an image. Also, the inventive concept relates to a recording medium having recorded thereon metadata for displaying an image.

BACKGROUND ART

Display devices capable of displaying an image may have different capabilities of expressing colors, for example, a color gamut, which is a range of colors that may be reproduced, depending on a panel or performance of the display devices.

Therefore, in the case where a color gamut of color information of an input image is different from a color gamut of a display device that reproduces colors of the input image, a color reproduction characteristic of the display device may improve by appropriately converting the input image so that the color gamuts may match each other.

For example, in the case where the color gamut of the input image is narrower than the color gamut of the display device, it is required to appropriately correct the input image in order to improve a color reproduction characteristic of an image displayed by the display device.

DETAILED DESCRIPTION OF THE INVENTIVE CONCEPT

Technical Problem

The inventive concept provides a method and a device for correcting and displaying an image based on metadata when a color gamut of an input image is different from a color gamut of a display device.

Advantageous Effects

According to an exemplary embodiment, the display device may correct a narrow gamut image to express colors of a wide gamut image and display the corrected narrow gamut image by using the metadata.

BEST MODE

Figure 1:
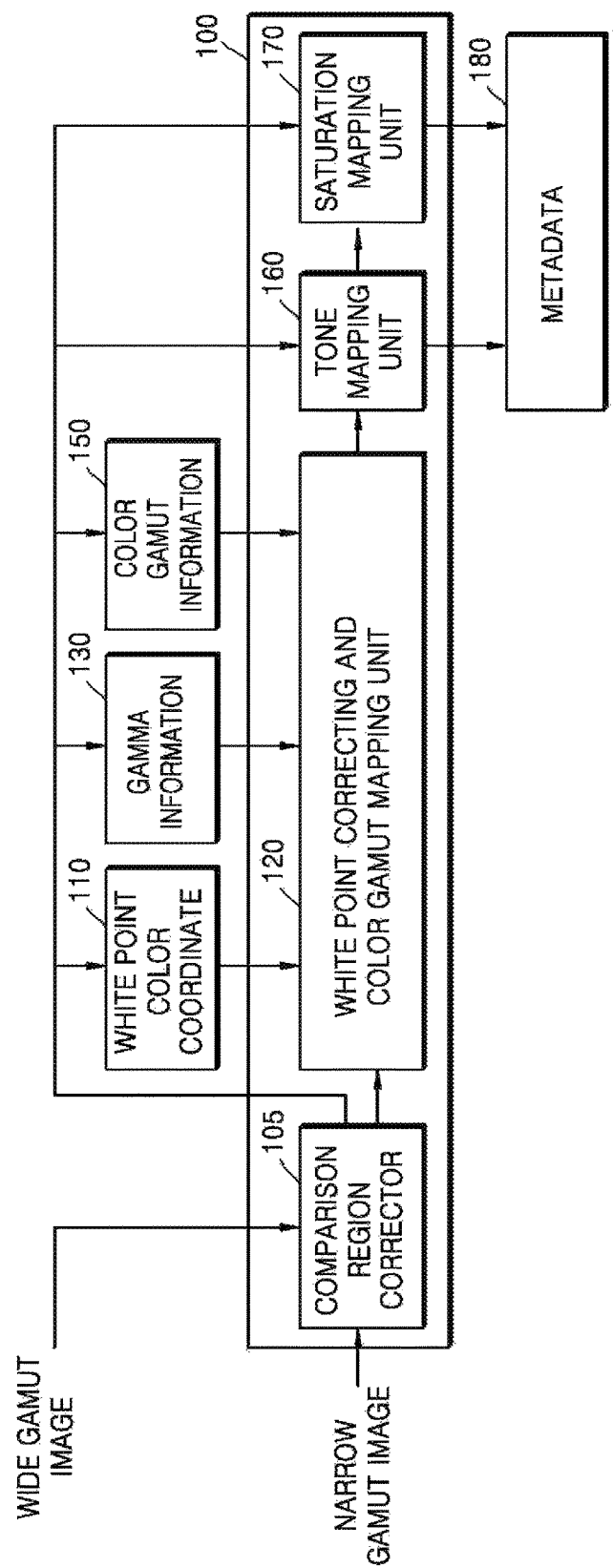
FIG. 1 is a block diagram illustrating an inner structure of a device that generates metadata according to an exemplary embodiment.

According to an aspect of the inventive concept, there is provided a method of generating metadata, the method including: obtaining a first image and a second image respectively having different color gamuts; obtaining at least one of information regarding a white point of the second image and information regarding the color gamut of the second image; correcting the first image based on the obtained information; and generating the metadata based on a correspondence relation between color information of the corrected first image and color information of the second image.

The correcting of the first image may include: converting a color coordinate of a white point of the first image based on a color coordinate of the white point of the second image; and correcting the first image based on the converted color coordinate of the white point of the first image.

The correcting of the first image may include: after correcting the first image based on the converted color coordinate of the white point of the first image, mapping the color gamut of the first image to the color gamut of the second image; and correcting the first image based on the mapped color gamut of the first image.

The generating of the metadata may include: obtaining a brightness value of at least one pixel of the first image; obtaining a brightness value of a pixel of the second image that corresponds to the at least one pixel; and generating the metadata based on a brightness value of a pixel of the second image that corresponds to a brightness value of each pixel of the first image.

The generating of the metadata based on the brightness value may include: obtaining a function representing the brightness value of the second image that corresponds to the brightness value of the first image based on the obtained brightness values of the first and second images; correcting the function such that the obtained function has a form of a linear function; and generating the metadata based on the corrected function.

The generating of the metadata may include: obtaining a saturation value of at least one pixel of the first image; obtaining a saturation value of a pixel of the second image that corresponds to the at least one pixel; and generating the metadata based on a saturation value of the second image that corresponds to a saturation value of each pixel of the first image.

The generating of the metadata based on the saturation value may include: obtaining a function representing a saturation value of the second image that corresponds to a saturation value of the first image for each of at least one hue; and generating the metadata based on the function.

The obtaining of the first image and the second image may include: matching the first image with the second image by scaling or cropping the first image and the second image.

According to another aspect of the inventive concept, there is provided a method of displaying a first image based on metadata, the method including: obtaining the first image and the metadata; obtaining at least one of information regarding a white point of a second image having a color gamut different from that of the first image, and information regarding the color gamut; correcting the first image based on the obtained information; correcting the corrected first image based on the metadata; and displaying the first image corrected based on the metadata.

The correcting of the first image based on the obtained information may include: converting a color coordinate of a white point of the first image based on a color coordinate of the white point of the second image; and correcting the first image based on the converted color coordinate of the white point of the first image.

The correcting of the first image based on the obtained information may include: after correcting the first image based on the converted color coordinate of the white point of the first image, mapping the color gamut of the first image to the color gamut of the second image; and correcting the first image based on the mapped color gamut of the first image.

The correcting of the first image based on the metadata may include: correcting the first image by converting a brightness value of at least one pixel of the first image based on the metadata.

The correcting of the first image may include: obtaining a brightness value of the second image that corresponds to the brightness value of the at least one pixel of the first image based on the metadata, and converting the brightness value of the at least one pixel based on the obtained brightness value.

The correcting of the first image based on the metadata may include: obtaining a saturation value of at least one pixel of the first image; and correcting the first image by converting the saturation value of the at least one pixel based on the metadata.

The correcting of the first image may include: converting the saturation value of the at least one pixel based on graph information representing a saturation value of the second image corresponding to a saturation value of the first image for each of at least one hue.

According to another aspect of the inventive concept, there is provided a recording medium having recorded thereon metadata for correcting a first image, wherein the metadata includes: information regarding a brightness value of a second image that corresponds to a brightness value of the first image corrected based on at least one of information regarding a white point and information regarding a color gamut of the second image; and information regarding a saturation value of the second image that corresponds to a saturation value of the corrected first image.

According to another aspect of the inventive concept, there is provided a device for generating metadata, the device including: a receiver for obtaining a first image and a second image respectively having different color gamuts, and obtaining at least one of information regarding a white point and information regarding the color gamut of the second image; and a controller for correcting the first image based on the obtained information, and generating the metadata based on a correspondence relation between color information of the corrected first image and color information of the second image.

According to another aspect of the inventive concept, there is provided a device for displaying a first image based on metadata, the device including: a receiver for obtaining at least one of information regarding a white point and information regarding a color gamut of a second image having a color gamut different from that of the first image, the first image, and the metadata; a controller for correcting the first image based on the obtained information, and correcting the corrected first image based on the metadata; and a display unit for displaying the first image corrected based on the metadata.

Mode of the Invention

Hereinafter, exemplary embodiments are described in detail with reference to the accompanying drawings. However, detailed descriptions of known functions or constructions are omitted in the description below and the accompanying drawings so that they may not obscure the spirit of the exemplary embodiments. Also, it is noted that like reference numerals are used for like elements throughout the drawings.

Terms or words used for the present specification and claims described below should not be construed as being limited to their general or dictionary meaning, and an inventor should construe his invention using meanings and concepts matching the technical spirit of the exemplary embodiments based on the principle that the inventor may appropriately define his invention with terms for explaining it in the best way. Therefore, since embodiments described in the present specification and constructions illustrated in the drawings are mere exemplary embodiments and do not reflect all of the technical spirit of exemplary embodiments, it should be understood that there may be various equivalents and modifications that may replace these at the time of filing.

In the accompanying drawings, some elements have been exaggerated, omitted, or schematically illustrated, and the size of each element does not fully reflect an actual size. Exemplary embodiments are not limited to a relative size or interval drawn in the accompanying drawings.

When something "includes" a component, another component may be further included unless specified otherwise. Also, the term "unit" used herein refers to a software component or a hardware component such as a field-programmable gate array (FPGA) or an application-specific integrated circuit (ASIC), and the "unit" performs some functions. However, the "unit" is not limited to software or hardware. The "unit" may be formed so as to be in an addressable storage medium, or may be formed so as to operate one or more processors. Thus, for example, the "unit" may include components such as software components, object-oriented software components, class components, and task components, and may include processes, functions, attributes, procedures, subroutines, segments of program code, drivers, firmware, microcodes, circuits, data, a database, data structures, tables, arrays, and variables. A function provided by the components and "units" may be associated with a smaller number of components and "units", or may be divided into additional components and "units".

A term "image" used throughout the present specification may be used to mean not only "image" itself but also a comprehensive term for explaining various forms of video image information that may be known as a 'frame', a 'field', and a 'slide' in related fields.

An 'image' that may be processed in an exemplary embodiment may include not only a photo or a moving picture but also a partial or entire screen that may be displayed by the display device. Although an 'image' is generally described in the present specification, for convenience of description, an 'image' described below may include not only a photo or a moving picture, which is its original meaning, but also a screen that may be displayed such as a user interface or a web page.

A white point of an image may denote a color coordinate of white color displayed in an image. When a white point changes, the brightness of an image may change.

A gamma value represents a range of gray scale expression that expresses light and shadow of an image, and adjustment of the gamma value may change a contrast of an image.

A gamut denotes a color space region that may be displayed in an image, from among an entire light spectrum. For example, color gamut information may change depending on a color system according to which an image is displayed, such as red, green, and blue (RGB), or cyan, magenta, yellow, black (CMYK). Images may be classified into wide gamut images and narrow gamut images depending on color gamut information. For example, wide gamut images denote images having a wide color gamut, and may include images having color systems such as digital cinema package (DCP), digital cinema initiatives (DCI) used for a digital cinema, and an Adobe RGB, and high dynamic range (HDR) images mastered in a great amount of light and a wide color gamut. Narrow images denote images having a narrow color gamut, and may include images having color systems of 709 color levels and an sRGB color space.

A color system of an image according to an exemplary embodiment may include YCbCr (YUV), Lab, hue saturation value (HSV), etc. but is not limited thereto and may include various other types of color systems.

Hereinafter, exemplary embodiments are described in detail with reference to the accompanying drawings to enable those of ordinary skill in the art to easily carry out the exemplary embodiments. However, the exemplary embodiments may be implemented in various different forms and are not limited to the embodiments described herein. Also, in the drawings, for clear description of exemplary embodiments, elements irrelevant to the description have been omitted, and like reference numerals are used for like elements throughout the specification.

Hereinafter, exemplary embodiments of the inventive concept are described with reference to the accompanying drawings.

FIG. 1 is a block diagram illustrating an inner structure of a device that generates metadata according to an exemplary embodiment.

A device 100 that generates the metadata 180 according to an exemplary embodiment may generate metadata 180 based on a correspondence relation between color information of a wide gamut image and color information of a narrow gamut image respectively having different color gamut. For generation of the metadata, the wide gamut image and the narrow gamut image may be input to the device 100.

A display device for displaying an image may display the narrow gamut image so that the narrow gamut image may be close to colors of the wide gamut image by using the metadata 180. Also, the display device for displaying an image may display the wide gamut image so that the wide gamut image may be close to colors of the narrow gamut image by using the metadata 180.

In the case where the display device has a display panel that may express a color gamut wider than a color gamut of a displayed image, the display device may correct and display the image by using metadata. The display device may correct the input narrow gamut image by using metadata so that colors of a wider color gamut may be expressed from the input image.

In contrast, in the case where the display device has a display panel that may express a color gamut narrower than a color gamut of a displayed image, the display device may correct and display the image by using metadata. The display device may correct the input wide gamut image by using the metadata so that colors of a narrower color gamut may be expressed from the input image.

Hereinafter, description is given of a method in which a display device corrects an image of a narrow color gamut by using metadata.

The metadata may be generated by comparing color information of the narrow gamut image with color information of the wide gamut image. The display device may correct the narrow gamut image in order to express colors of the wide gamut image from the narrow gamut image based on the metadata. Also, the display device may correct the wide gamut image in order to express colors of the narrow gamut image from the wide gamut image based on the metadata. The metadata used for correcting the narrow gamut image and the wide gamut image may include the same data.

According to an exemplary embodiment, the device 100 that generates metadata may correct a narrow gamut image based on a white point and color gamut information of a wide gamut image before generating the metadata by comparing color information of the narrow gamut image with color information of the wide gamut image. Since colors of an image may change when a white point of the image is converted, the device 100 may correct the white point of the image first.

Also, the device 100 may correct colors that may be distorted due to a difference in color gamut first by mapping colors included in a color gamut of the narrow gamut image based on a color gamut of the wide gamut image. After that, the device 100 may generate metadata by obtaining a correspondence relation between brightness values and saturation values of the corrected narrow gamut image and the wide gamut image.

The device 100 may be a server device for generating metadata corresponding to an image.

Referring to FIG. 1, the device 100 for generating the metadata 180 may include a comparison region corrector 105, a white point correcting and color gamut mapping unit 120, a tone mapping unit 160, and a saturation mapping unit 170.

In the case where the resolutions or matching regions of the narrow gamut image and the wide gamut image are different from each other, the comparison region corrector 105 may correct the images so that the images may match each other. In the case where partial regions of the narrow gamut image and the wide gamut image do not match each other, the comparison region corrector 105 may crop the two images so that the two images may include the same content at the same location. For example, the comparison region corrector 105 may crop the two images by extracting feature points for each predetermined region of the images, and cutting or moving the images so that the feature points of the two images may exist at the same locations. Also, the comparison region corrector 105 may perform scaling so that the content of the two images may have the same resolution by using horizontal and vertical values of the cropped images.

The white point correcting and color gamut mapping unit 120, the tone mapping unit 160, and the saturation mapping unit 170 may perform operations for generating metadata by using the narrow gamut image and the wide gamut image corrected by the comparison region corrector 105.

The white point correcting and color gamut mapping unit 120 may correct a white point of the narrow gamut image based on information of a white point color coordinate 110 of the wide gamut image. Since results of color gamut mapping, tone mapping, and saturation mapping of the narrow gamut image to be performed afterward may change depending on a white point, the device 100 may perform correction of the white point of the narrow gamut image first of all.

The white point correcting and color gamut mapping unit 120 may correct the narrow gamut image so that the white point of the narrow gamut image may be the same as the white point of the wide gamut image. For example, the white point correcting and color gamut mapping unit 120 may convert a color coordinate of the white point of the narrow gamut image into a color coordinate of the white point of the wide gamut image, and correct the narrow gamut image according to the converted color coordinate of the white point. Colors of the narrow gamut image may change on the whole depending on the converted white point of the narrow gamut image.

In the case where the white point of the narrow gamut image is the same as the white point of the wide gamut image, the white point correcting and color gamut mapping unit 120 may bypass the narrow gamut image without correcting the narrow gamut image.

Also, the white point correcting and color gamut mapping unit 120 may map a color gamut of the narrow gamut image to a color gamut of the wide gamut image based on gamma information and color gamut information of the wide gamut image and the narrow gamut image. That is, the white point correcting and color gamut mapping unit 120 may map color information belonging to the color gamut of the narrow gamut image based on the color gamut of the wide gamut image. Before the color gamut mapping, in the case where a narrow gamut image is displayed by a device that may express a wide gamut image, the image is displayed based on the wide color gamut, and color coordinates corresponding to colors move to different locations, so that original colors may be distorted and displayed.

The white point correcting and color gamut mapping unit 120 may map a color coordinate of each color based on the wide color gamut so that colors of the narrow gamut image may not be distorted. Therefore, since color gamut mapping is performed, an image is prevented from being displayed in colors different from the original colors due to a difference in color gamut. Since color gamut information may be determined depending on the locations of primary colors on a color gamut, the color gamut information may include color coordinate values (x, y) of colors R, G, and B which are the primary colors.

A linear degree of an output image with respect to an input image is determined depending on a gamma value. When the gamma value is large, an image becomes dark. Therefore, before the color gamut mapping, the white point correcting and color gamut mapping unit 120 may perform reverse gamma correction so that the narrow gamut image may have colors before gamma correction.

The white point correcting and color gamut mapping unit 120 may reverse gamma-correct the narrow gamut image so that the narrow gamut image may have the original colors based on gamma information applied to the narrow gamut image.

The white point correcting and color gamut mapping unit 120 may map a color gamut of the narrow gamut image to the reverse gamma-corrected narrow gamut image based on color gamut information of the wide gamut image. In the case where the narrow gamut image before the mapping is displayed by the display device that may express colors of the wide color gamut, colors of the narrow gamut image may be displayed in colors different from the original colors due to difference in the color gamut. For example, in the case of colors R, G, and B, which are the primary colors, color information may be equally displayed as information representing the colors R, G, and B even though color coordinates of the colors R, G, and B in the wide gamut image and the narrow gamut image are different from each other. Therefore, the white point correcting and color gamut mapping unit 120 may correct color information of the narrow gamut image so that the narrow gamut image may be displayed without distortion by the display device that may express colors of the wide color gamut. The white point correcting and color gamut mapping unit 120 may correct the color information of the narrow gamut image based on a color gamut of the wide gamut image.

When the narrow gamut image is displayed by the display device that may express the wide color gamut, since color coordinates of the narrow gamut image before the color gamut mapping may be located on the color gamut of the wide gamut image unlike color coordinates of real colors, the original colors may be distorted and displayed. However, when the narrow gamut image is displayed by the display device that may express the wide color gamut, since the color gamut is mapped by the white point correcting and color gamut mapping unit 120, color coordinates of respective pixels of the corrected narrow gamut image may be located inside the color gamut of the narrow gamut image. Therefore, colors of the corrected narrow gamut image may be expressed by the display device without distortion.

The white point correcting and color gamut mapping unit 120 may maintain a gamma value held by the narrow gamut image by gamma-correcting again the narrow gamut image corrected by the mapping of the color gamut. A gamma value that may be applied to the narrow gamut image may be a gamma value that has been applied to the narrow gamut image before the narrow gamut image is reverse gamma-corrected.

The white point color coordinate 110, gamma information 130, and color gamut information 150 may be values determined in advance depending on whether an image type of the wide gamut image and the narrow gamut image is an Adobe RGB image, a DCI 709 image, or an sRGB image, for example.

The white point correcting and color gamut mapping unit 120 may perform at least one of white point correction and color gamut mapping by using at least one of the white point color coordinate 110, the gamma information 130, and the color gamut information 150.

The tone mapping unit 160 may generate the metadata 180 by comparing a brightness value of a pixel of the wide gamut image with a brightness value of a corresponding pixel of the narrow gamut image.

The tone mapping unit 160 may convert RGB values of respective pixels of the wide gamut image and the narrow gamut image into Y values representing brightness information. The Y values may be obtained by multiplying R, G, and B values by weight for conversion to a brightness value as in Equation 1.

$$Y=(w1*R+w2*G+w3*B)/(w1+w2+w3), (w1+w2+w3=1)$$ Equation 1 w1, w2, and w3, which are weight values, may be determined as various values depending on a method of obtaining a brightness value. For example, a Y value may be determined as Y=0.299R+0.587G+0.114B.

$$Y=\max(R,G,B)$$ Equation 2

For another example, a Y value may be determined as a maximum value among R, G, and B as in Equation 2.

The tone mapping unit 160 may obtain a tone mapping correction function representing a brightness value of an image of a wide color gamut with respect to a brightness value of an image of a narrow color gamut by allowing brightness values of respective pixel values of the images of the wide color gamut and the narrow color gamut to correspond to each other. Brightness values of pixels of the wide color gamut and the narrow color gamut existing on the same location may correspond to each other.

In the tone mapping correction function, a plurality of brightness values of a wide gamut image may match with respect to the same brightness value of a narrow gamut image, or a plurality of brightness values of a narrow gamut image may match with respect to the same brightness value of a wide gamut image. When displaying an image by using the metadata 180, it is difficult to clearly correct a narrow gamut image by using the tone mapping correction function in which a plurality of values are matched with respect to one value. Therefore, the tone mapping unit 160 may correct the tone mapping correction function so that one brightness value of a wide gamut image may be matched with respect to one brightness value of a narrow gamut image. For example, the tone mapping unit 160 may correct the tone mapping correction function so that an average value or a median value, etc. of a plurality of values may be mapped to one value to which the plurality of values are mapped, by performing linear regression on the tone mapping correction function.

The tone mapping unit 160 may generate a value of each point of the corrected tone mapping correction function as the metadata 180. For example, the tone mapping unit 160 may generate the metadata 180 in which values for 64 points among brightness values located in the tone mapping correction function are expressed as a look up table (LUT). A value for each point may include both a brightness value of a narrow gamut image and a brightness value of a corresponding wide gamut image, or may include a gain, which is a value obtained by dividing a brightness value of the wide gamut image by a brightness value of a narrow gamut image.

Also, the tone mapping unit 160 may correct a brightness value of each pixel of the narrow gamut image by using a brightness value of the wide gamut image.

The saturation mapping unit 170 may generate the metadata 180 by comparing a saturation value of a pixel of the wide gamut image with a saturation value of a corresponding pixel of the narrow gamut image. When the narrow gamut image corrected by the tone mapping unit 160 is displayed by the display device that may display a wide gamut image, only colors inside the narrow color gamut may be still expressed. Therefore, the saturation mapping unit 170 may generate the metadata 180 so that colors of the narrow gamut image may be converted according to colors of a corresponding region of the wide gamut image. The metadata 180 may include a mapping function for each hue and each saturation gray scale generated by comparison of a saturation value of the wide gamut image with a saturation value of the narrow gamut image.

The saturation mapping unit 170 may generate a mapping function for each saturation gray scale with respect to the plurality of hues by comparing saturation of the wide gamut image with saturation of the narrow gamut image on a pixel basis. As in the case of the tone mapping function, the saturation mapping unit 170 may obtain saturation values of pixels of the wide gamut image and corresponding pixels of the narrow gamut image, respectively, and a mapping function for each saturation gray scale with respect to each hue, representing a saturation value of the wide gamut image with respect to a saturation value of the narrow gamut image. For example, the saturation mapping unit 170 may generate a mapping function for each saturation gray scale with respect to each of six colors including red (R), green (G), blue (B), cyan (C), magenta (M), and yellow (Y). The saturation mapping unit 170 may determine color of the six colors to which a saturation value of the narrow gamut image belongs, and generate the mapping function for each saturation gray scale on a color basis by using a corresponding saturation value of the wide gamut image.

Obtaining the mapping function for each saturation gray scale on a color basis takes into account an aspect that differences in the locations and sizes of the color gamut of the narrow gamut image and the wide gamut image may change on a color basis. For example, like a color gamut of a 709 image and a color gamut of a DCI image, in the case where the locations of a color B among the primary colors are similar and differences in the locations and regions of color gamut for the color B are similar, adjustment of a saturation value with respect to the 709 image may be relatively small. In contrast, since differences in the locations and regions of color gamut are large for color R or G, adjustment of a saturation value with respect to the 709 image may be relatively large.

The mapping function for each saturation gray scale may include a value in which a color inside a color gamut of the narrow gamut image is mapped to have the same color coordinate even in a color gamut of the wide gamut image according to mastered wide gamut and narrow gamut images. This is referred to as mastering the wide gamut image and the narrow gamut image according to a clipping method. The mastering may denote a process in which an image is edited and produced by an image producer.

Alternatively, the mapping function for each saturation gray scale may include a value in which a color inside a color gamut of the narrow gamut image is mapped to extend in proportion to a color gamut of the wide gamut image. This is referred to as mastering the wide gamut image and the narrow gamut image according to a compression method.

Like the tone mapping unit 160, the saturation mapping unit 170 may generate a value of each point of the function for each hue and each saturation gray scale as the metadata 180. For example, the saturation mapping unit 170 may generate the metadata 180 in which values for 48 points located in the function for each hue and each saturation gray scale are expressed as a look up table (LUT). A value for each point may include both a saturation value of the narrow gamut image and a saturation value of the corresponding wide gamut image, or may include a value obtained by dividing a saturation value of the wide gamut image by a saturation value of the narrow gamut image, which is a gain value of the saturation value of the wide gamut image with respect to the saturation value of the narrow gamut image.

In the case of a wide gamut image mastered in the clipping method, the metadata 180 may include a saturation value of a gain value (a saturation value of a narrow gamut image with respect to a saturation value of a wide gamut image) of the wide gamut image or the narrow gamut image with respect to a point located in a wide gamut region excluding a narrow gamut region.

In the case of a wide gamut image mastered in the compression method, the metadata 180 may include one gain value (a saturation value of a narrow gamut image with respect to a saturation value of a wide gamut image) or a gain value applied on a section basis.

Also, the gain value (a saturation value of a narrow gamut image with respect to a saturation value of a wide gamut image) of the metadata 180 may be determined by further taking into account a brightness value of each pixel. For example, in the case where a brightness value of a pixel belongs to a too bright or too dark region, a gain value for a saturation value corresponding to the pixel may be determined small.

According to an exemplary embodiment, the metadata may be generated by the device 100 as described above, but is not limited thereto, and may be generated based on a signal input by a user. For example, the tone mapping correction function, the mapping function for each saturation gray scale, the look up table, etc. of the metadata may be generated based on a signal input by a user.

The method of generating the metadata is described in more detail with reference to FIGS. 2 to 7. The narrow gamut image and the wide gamut image are concepts that may correspond to a first image and a second image, respectively, to be described below.

Figure 2:
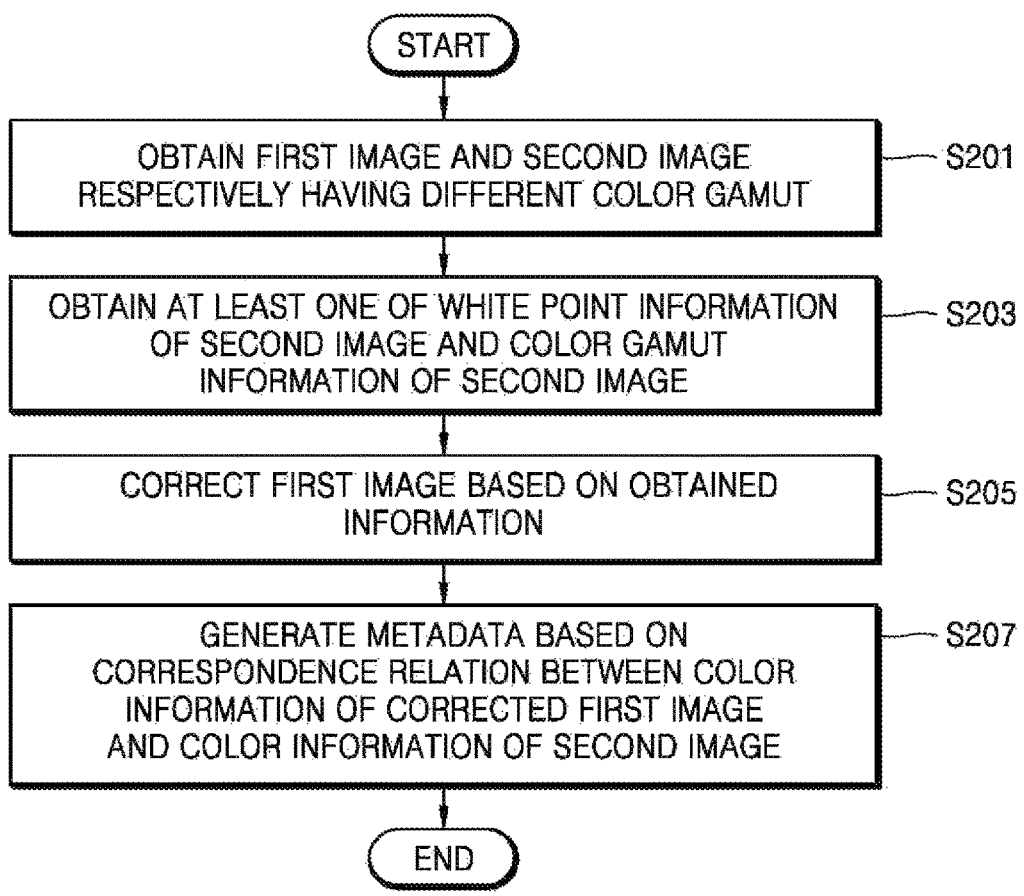
FIG. 2 is a flowchart illustrating a method of generating metadata according to an exemplary embodiment.

FIG. 2 is a flowchart illustrating a method of generating metadata according to an exemplary embodiment.

Referring to FIG. 2, in operation S201, the device 100 for generating the metadata may obtain a first image and a second image each having a different color gamut. The first image and the second image may be images including content of the same content and having color gamut that may be expressed by a display device is different from each other.

In addition, the device 100 may perform the cropping and scaling so that resolutions and content of the first image and the second image may be the same.

In operation S203, the device 100 may obtain at least one of white point information and color gamut information of the second image. Also, in operation S205, the device 100 may correct the first image based on at least one of the white point information and the color gamut information obtained in operation S203.

The device 100 may correct the first image by converting a color coordinate of a white point of the first image based on a color coordinate of a white point of the second image. Also, the device 100 may correct the first image by mapping a color gamut of the first image based on a color gamut of the second image. Since a result of color gamut mapping may change depending on a white point, color gamut mapping for the first image may be performed after the first image is corrected by converting a color coordinate of the white point.

The device 100 may perform color gamut mapping after reverse gamma-correcting the first image so that color gamut mapping may be performed on the original colors, and may gamma-correct the first image again after the color gamut mapping.

In operation S207, the device 100 may generate metadata based on a correspondence relation between color information of the first image corrected in operation S205 and color information of the second image. For example, the device 100 may generate metadata including information regarding brightness values and saturation values of corresponding pixels of the corrected first image and the second image.

The device 100 may obtain a tone mapping correction function representing a brightness value of the second image that corresponds to a brightness value of the first image, and generate metadata based on the tone mapping correction function.

Also, the device 100 may obtain a mapping function for each hue and each saturation gray scale representing a saturation value of the second image that corresponds to a saturation value of the first image, and generate metadata based on the mapping function for each hue and each saturation gray scale.

Figure 3:
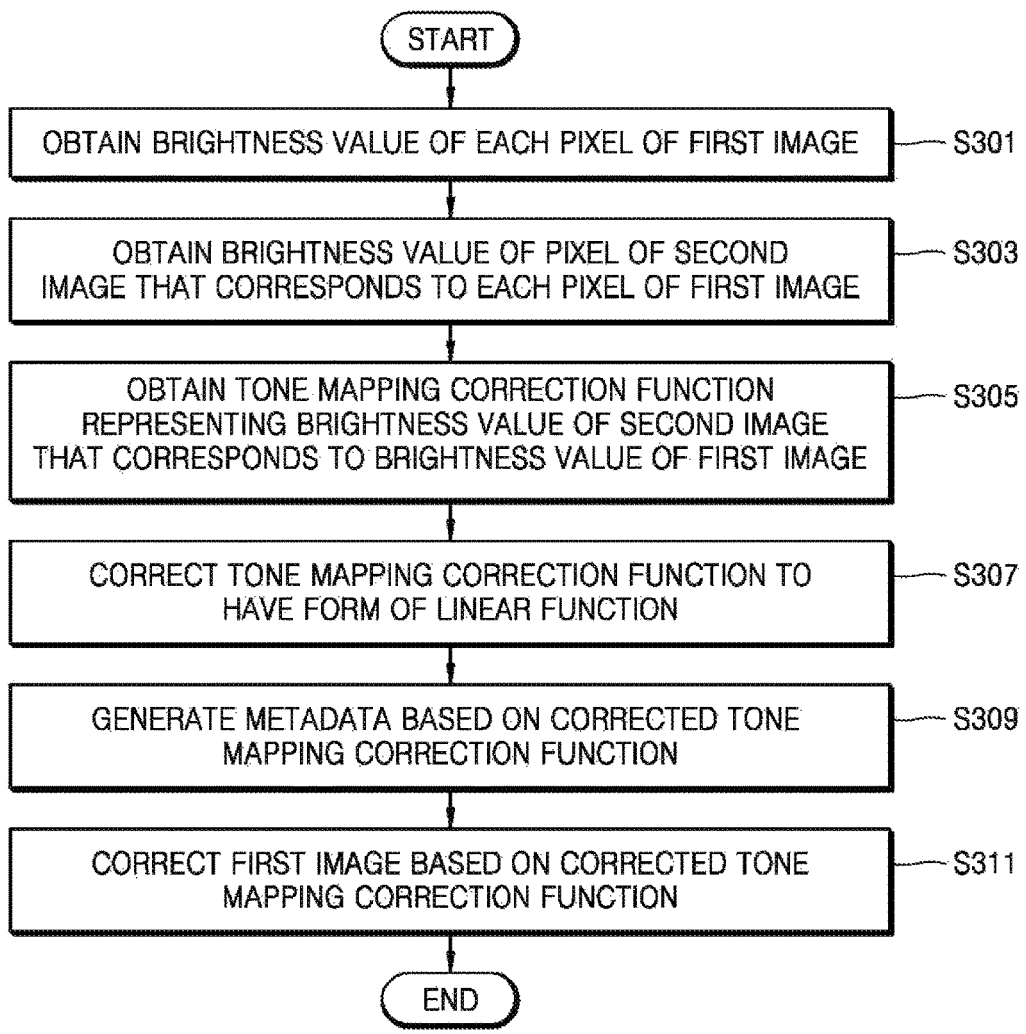
FIG. 3 is a flowchart illustrating a method of generating metadata based on a tone mapping correction function according to an exemplary embodiment.

FIG. 3 is a flowchart illustrating a method of generating metadata based on a tone mapping correction function according to an exemplary embodiment.

Referring to FIG. 3, in operation S301, the device 100 may obtain a brightness value for each pixel of the first image. The device 100 may obtain a brightness value from R, G, and B values of pixels by using a predetermined equation.

In operation S303, the device 100 may obtain a brightness value of a pixel of the second image that corresponds to each pixel of the first image. Like operation S301, the device 100 may obtain a brightness value of a pixel from R, G, and B values of pixels by using a predetermined equation.

In operation S305, the device 100 may obtain a tone mapping correction function representing a brightness value of the second image that corresponds to the brightness value of the first image obtained in operations S301 to S303.

In the tone mapping correction function, there may exist a plurality of brightness values of the second image that correspond to the same brightness value of the first image. Therefore, in operation S307, the device 100 may correct the tone mapping correction function so that the tone mapping correction function may have a form of a linear function and thus one brightness value of the second image may correspond to one brightness value of the first image. For example, in the case where a plurality of brightness values of the second image correspond to one brightness value of the first image, the device 100 may correct the tone mapping correction function so that one value that may represent the plurality of brightness values of the second image may correspond to the brightness value of the first image. One value that may represent the plurality of brightness values of the second image may be determined as an average value or a median value of the plurality of brightness values.

In operation S309, the device 100 may generate metadata based on the tone mapping correction function corrected in operation S307. The metadata may include a value representing the corrected tone mapping correction function. For example, the device 100 may generate the metadata 180 in which values for 64 points located in the corrected tone mapping correction function are expressed in the form of a look up table (LUT). A value for each point may include both a brightness value of the first image and a brightness value of the corresponding second image, or may include a gain value of the brightness value of the second image with respect to the brightness value of the first image.

In operation S311, the device 100 may also correct the first image based on the tone mapping correction function corrected in operation S307. For example, the device 100 may correct the first image by converting each brightness value of the first image into a corresponding brightness value of the second image based on the corrected tone mapping correction function. In subsequent operation, the device 100 may obtain a mapping function for each saturation gray scale by using the first image corrected based on the corrected tone mapping correction function, and generate metadata based on the mapping function for each saturation gray scale.

Figure 4:
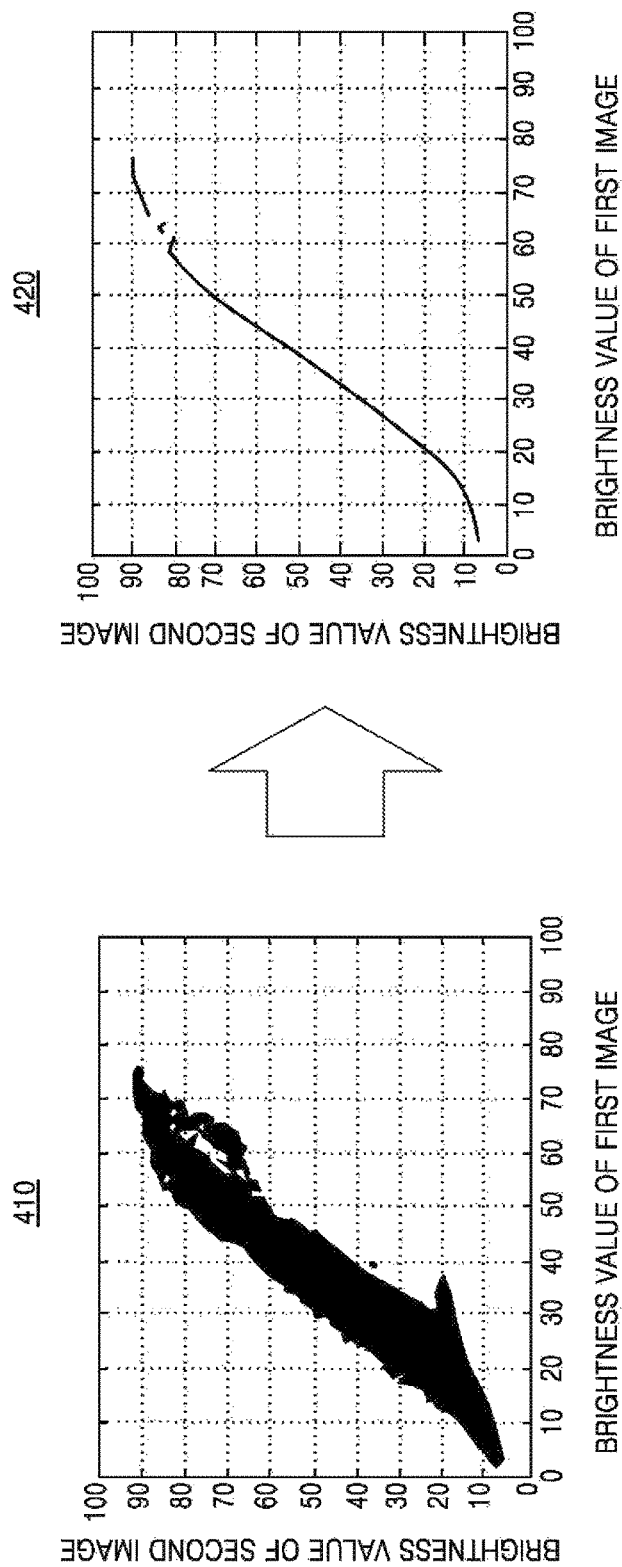
FIG. 4 is a graph illustrating an example of correcting a tone mapping correction function according to an exemplary embodiment.

FIG. 4 is a graph illustrating an example of correcting a tone mapping correction function according to an exemplary embodiment.

Referring to 410, in a tone mapping correction function before correction in which x axis represents a brightness value of the first image and y axis represents a brightness value of the second image, there exist a plurality of brightness values of the second image that correspond to one brightness value of the first image. Therefore, in the case of correcting the first image based on the tone mapping correction function, corresponding values exist in the plural and thus it is difficult to perform accurate correction.

Therefore, the device 100 may correct the tone mapping correction function so that one brightness value of the second image may be mapped to one brightness value of the first image as in the graph illustrated in 420. The device 100 may determine a representative value among a plurality of brightness values of the second image that correspond to one brightness value of the first image, and correct the tone mapping correction function so that only one determined representative value may correspond to the brightness value of the first image. For example, the device 100 may correct the tone mapping correction function by determining a representative value among brightness values of the second image every 64 points located in the tone mapping correction function.

Figure 5:
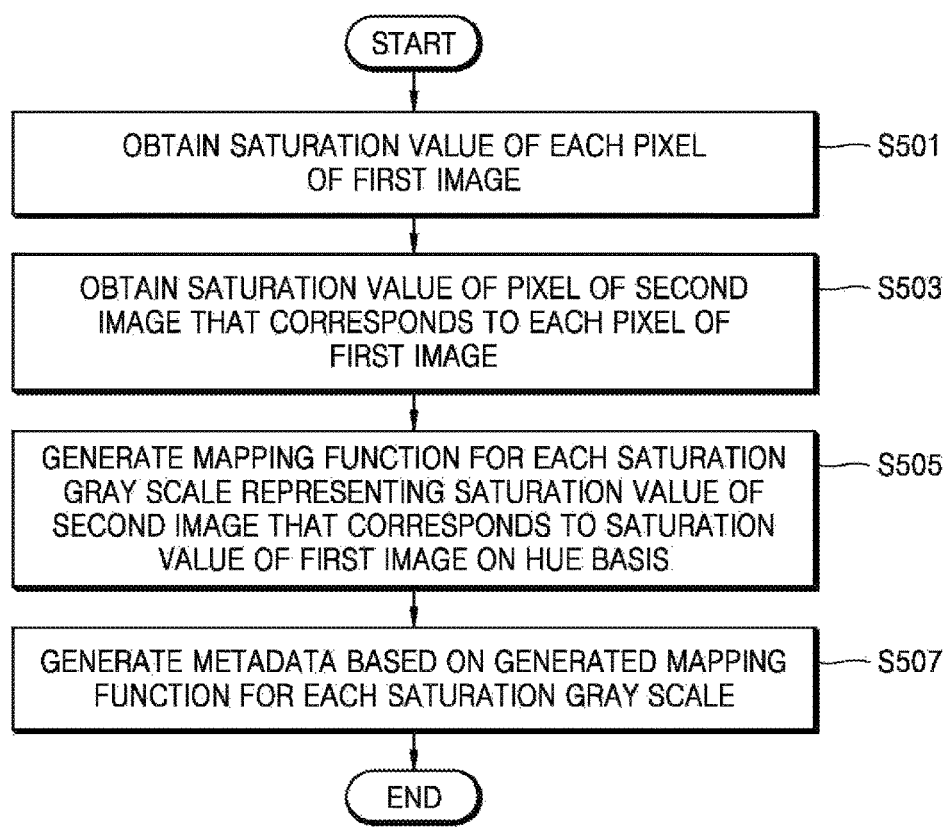
FIG. 5 is a flowchart illustrating a method of generating metadata based on a mapping function for each saturation gray scale according to an exemplary embodiment.

FIG. 5 is a flowchart illustrating a method of generating metadata based on a mapping function for each saturation gray scale according to an exemplary embodiment.

Referring to FIG. 5, in operation S501, the device 100 may obtain a saturation value of each pixel of the first image. For example, the device 100 may obtain a color difference signal excluding a brightness signal from RGB values, and obtain a saturation value from the color difference signal. The saturation value is not limited to the above example and may be obtained by using various methods.

In operation S503, the device 100 may obtain a saturation value of a pixel of the second image that corresponds to each pixel of the first image. The device 100 may obtain a saturation value of a pixel of the second image by using the same method used in operation S501.

In operation S505, the device 100 may generate the mapping function for each saturation gray scale representing a saturation value of the second image that corresponds to a saturation value of the first image based on the saturation value obtained in operations S501 and S502. For example, the device 100 may generate the mapping function for each saturation gray scale with respect to each of six colors including red (R), green (G), blue (B), cyan (C), magenta (M), and yellow (Y).

In operation S507, the device 100 may generate metadata based on the mapping function for each hue and each saturation gray scale generated in operation S505. The device 100 may generate the metadata by using different methods depending on a difference between the mastered first and second images.

In the case where the device 100 determines that the first and second images have been mastered according to the clipping method, a value that belongs to a color gamut of the first image among saturation values of the first image may have the same value as a saturation value of the second image. Therefore, the device 100 may generate metadata so that a gain value may be 1. In contrast, with respect to a saturation value of the first image among saturation values of the first image that does not belong to a color gamut of the first image but belongs to a color gamut of the second image, the device 100 may generate metadata including a gain value, which is a value obtained by dividing a saturation value of the second image by a saturation value of the first image.

In addition, in the case where the first image and the second image are mastered according to the compression method, the device 100 may generate metadata by obtaining, as a gain value, a value obtained by dividing a saturation value of the second image by a saturation value of the first image.

Figure 6:
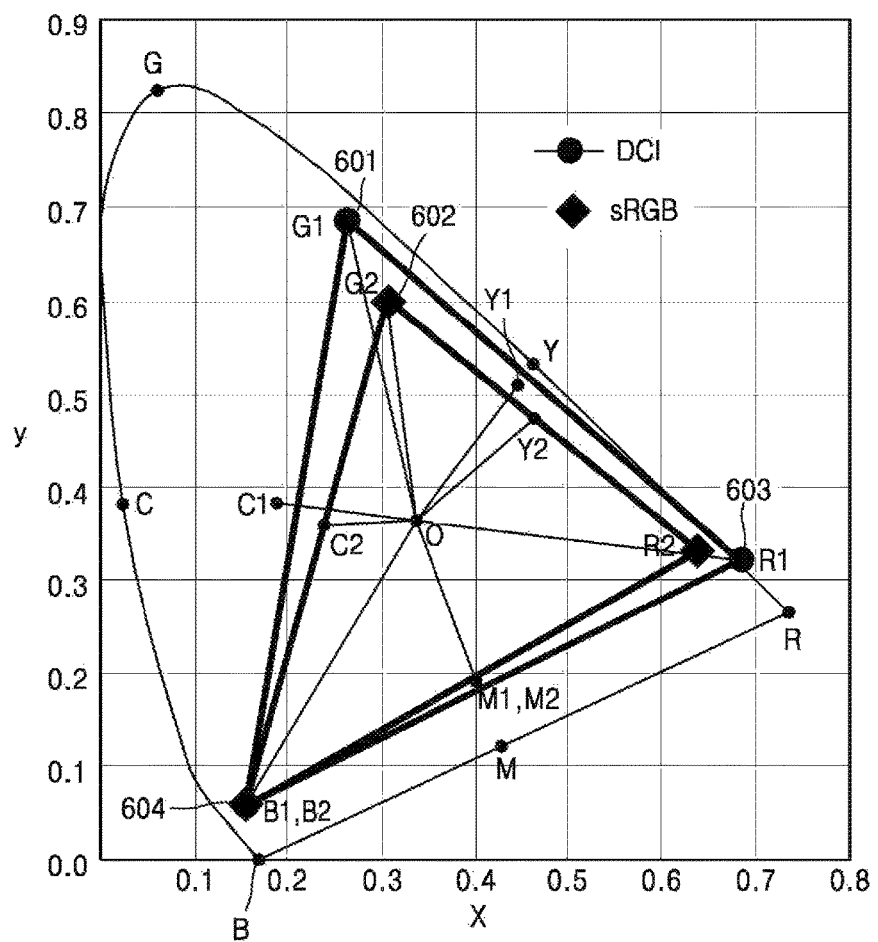
FIG. 6 is an exemplary view illustrating an example of a color gamut of a wide gamut image and a narrow gamut image according to an exemplary embodiment.

FIG. 6 is an exemplary view illustrating an example of a color gamut of a wide gamut image and a narrow gamut image according to an exemplary embodiment.

Referring to FIG. 6, a color gamut of a DCI image belonging to a relatively wide gamut image and a color gamut of an sRGB image belonging to a relatively narrow gamut image are illustrated. A color gamut of the DCI image is wider than a color gamut of the sRGB image, and particularly, a difference of a color gamut in a color G is large.

As described above, the mapping function for each saturation gray scale may be generated for each of six colors. Since color coordinates representing the primary colors are different from each other depending on the color gamut, displayed colors may be different depending on the color gamut even when color information of pixels is the same. Therefore, the device 100 may correct a narrow gamut image so that the narrow gamut image may be expressed in the same colors as colors of a wide gamut image when displaying the narrow gamut image, based on metadata.

With respect to a color G, for saturation values from 0 to G1 601 and saturation values from 0 to G2 602 illustrated in FIG. 6, a mapping function for each saturation gray scale may be generated. The mapping function for each saturation gray scale may represent saturation values from 0 to G1 of a wide gamut image that correspond to saturation values from 0 to G2 of a narrow gamut image. 0 represents a point having a lowest saturation value, and G1 and G2 represent points at which the primary colors having highest saturation values are located. A point 0 may change depending on a color gamut of each image. According to an exemplary embodiment, in the case where a white point of the narrow gamut image is converted into a white point of the wide gamut image, points 0 in a color gamut of the narrow gamut image and a color gamut of the wide gamut image may be the same. FIG. 6 illustrates that a point 0 in the narrow gamut is the same as a point 0 in the wide gamut, but is not limited thereto, and the points 0 in the narrow gamut and the wide gamut may exist on locations different from each other.

With respect to colors Y, C, B, M, and R, similarly, the mapping function for each saturation gray scale may represent saturation values from 0 to Y1, C1, B1 604, M1, and R1 603 of the wide gamut image that correspond to saturation values from 0 to Y2, C2, B2 604, M2, and R2 of the narrow gamut image.

Like the method of correcting the tone mapping function, even in the case of the mapping function for each hue and each saturation gray scale, there may exist a plurality of saturation values of a wide gamut image that correspond to one saturation value of a narrow gamut image. The device 100 may determine a representative value based on the plurality of saturation values of the wide gamut image that correspond to the one saturation value of the narrow gamut image, and determine the representative value as a value corresponding to the one saturation value of the narrow gamut image. The device 100 may finally generate the mapping function for each hue and each saturation gray scale where one saturation value of the wide gamut image that corresponds to each saturation value of the narrow gamut image exists.

Hereinafter, the method of displaying an image based on metadata is described in more detail with reference to FIGS. 7 to 9.

Figure 7:
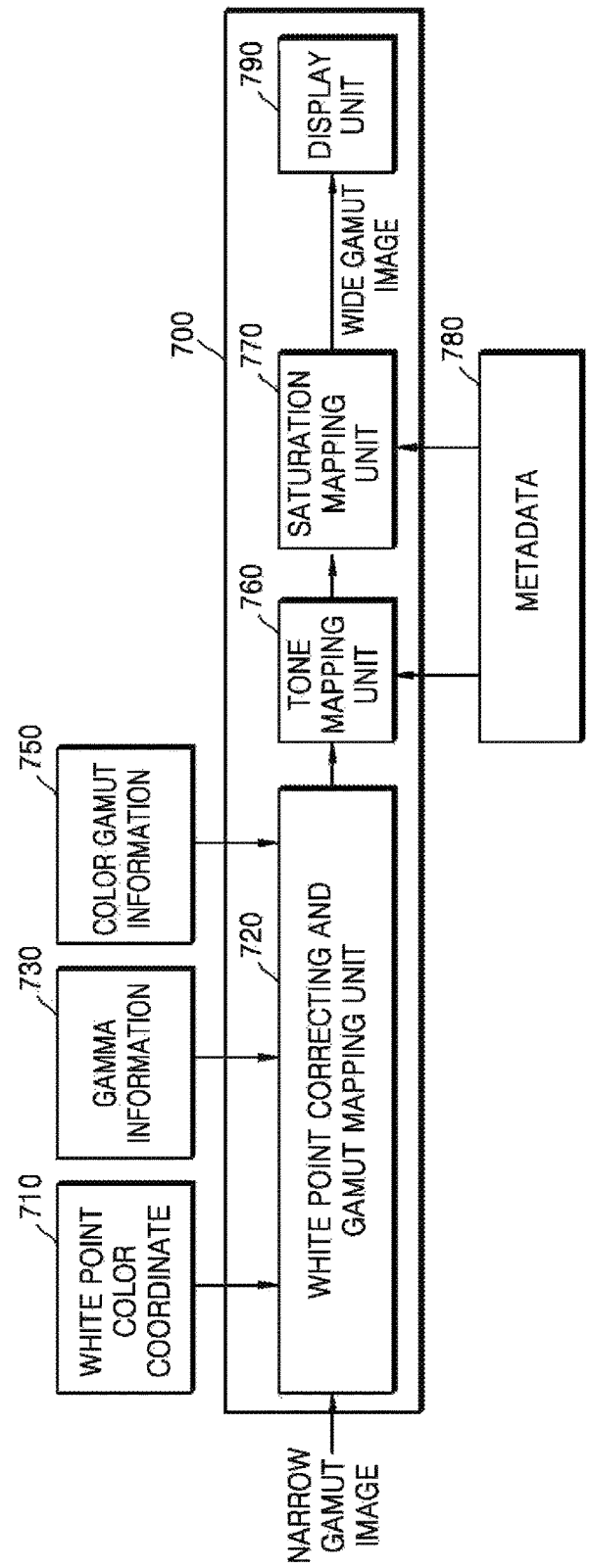
FIG. 7 is a block diagram illustrating an inner configuration of a display device for displaying an image based on metadata according to an exemplary embodiment.

FIG. 7 is a block diagram illustrating an inner configuration of a display device 700 for displaying an image based on metadata according to an exemplary embodiment.

The display device 700 for displaying an image based on the metadata according to an exemplary embodiment may display colors of a narrow gamut image like colors of a wide gamut image based on the metadata. The metadata may include information regarding a correspondence relation between color information of the narrow gamut image and color information of the wide gamut image. The display device 700 may be a device having a display panel that may express colors of the wide gamut image.

Referring to FIG. 7, the display device 700 may include a white point correcting and gamut mapping unit 720, a tone mapping unit 760, a saturation mapping unit 770, and a display unit 790. The white point correcting and gamut mapping unit 720 may correspond to the white point correcting and color gamut mapping unit 120 of FIG. 1. The white point correcting and gamut mapping unit 720 may correct the narrow gamut image by using the same method as that of the white point correcting and color gamut mapping unit 120 of FIG. 1.

The white point correcting and gamut mapping unit 720 may correct a white point of the narrow gamut image based on information of a white point color coordinate 710 of a wide gamut image. Like the white point correcting and color gamut mapping unit 120 of the device 100 that generates the metadata, the white point correcting and gamut mapping unit 720 may correct a white point of the narrow gamut image based on the information of the white point color coordinate 710 of the wide gamut image.

The white point color coordinate 710, gamma information 730, and color gamut information 750 may be values determined in advance depending on whether an image type of the wide gamut image and the narrow gamut image is an Adobe RGB image, a DCI 709 image, or an sRGB image, for example.

In the case where a white point of the narrow gamut image is the same as a white point of the wide gamut image, the white point correcting and gamut mapping unit 720 may bypass the narrow gamut image without correcting the narrow gamut image.

The white point correcting and gamut mapping unit 720 may map a color gamut of the narrow gamut image to a color gamut of the wide gamut image based on the gamma information 730 and the color gamut information 750 of the wide gamut image and the narrow gamut image. Like the white point correcting and color gamut mapping unit 120 of the device 100 that generates the metadata, the white point correcting and gamut mapping unit 720 may correct the narrow gamut image by mapping the color gamut of the narrow gamut image to the color gamut of the wide gamut image based on the gamma information 730 and the color gamut information 750 of the wide gamut image and the narrow gamut image.

The white point correcting and gamut mapping unit 720 may perform at least one of white point correction and color gamut mapping by using at least one of the white point color coordinate 710, the gamma information 730, and the color gamut information 750.

Without being limited to the above exemplary embodiment, the display device 700 may perform the white point correction after saturation mapping. The display device 700 may perform the white point correction after saturation mapping of an image by a saturation mapping unit 770.

The tone mapping unit 760 may correct colors of a narrow gamut image by correcting brightness values of respective pixels of the narrow gamut image based on metadata 780. The metadata 780 may correspond to the metadata 180 generated by the device 100 of FIG. 1. The metadata 780 may include information regarding a brightness value of the wide gamut image that corresponds to a brightness value of the narrow gamut image, generated based on the tone mapping correction function. For example, the metadata 780 may include a gain value of the brightness value of the narrow gamut image, which is a value obtained by dividing the brightness value of the wide gamut image by the brightness value of the narrow gamut image. The tone mapping unit 760 may correct the brightness value of the narrow gamut image by using a value obtained by multiplying each brightness value of the narrow gamut image by the gain value included in the metadata 780.

The saturation mapping unit 770 may correct colors of the narrow gamut image by correcting saturation values of respective pixels of the narrow gamut image based on the metadata 780. The metadata 780 may correspond to the metadata 180 generated by the device 100 of FIG. 1. The metadata 780 may include information regarding a saturation value of the wide gamut image that corresponding to a saturation value of the narrow gamut image, generated based on the mapping function for each hue and each saturation gray scale. For example, the metadata 780 may include a gain value of the saturation value of the narrow gamut image, which is a value obtained by dividing the saturation value of the wide gamut image by the saturation value of the narrow gamut image. The tone mapping unit 760 may correct the saturation value of the narrow gamut image by using a value obtained by multiplying each saturation value of the narrow gamut image by the gain value included in the metadata 780.

The display unit 790 may display the narrow gamut image corrected by the saturation mapping unit 770 and the tone mapping unit 760. The display unit 790 may have a display panel that may express colors of a wide color gamut, and display a narrow gamut image corrected to express the colors of the wide color gamut.

The display device 700 according to an exemplary embodiment may correct and display a narrow gamut image so that the narrow gamut image may express colors of a wide color gamut based on the metadata 780. The display device 700 may perform the correction so that the narrow gamut image may express the colors of the wide color gamut by using the narrow gamut image having a data size relatively smaller than that of a wide gamut image, and the metadata 780. Therefore, the display device 700 may display the narrow gamut image that may express the colors of the wide color gamut by using data having a size relatively smaller than that of data of the wide gamut image.

Figure 8:
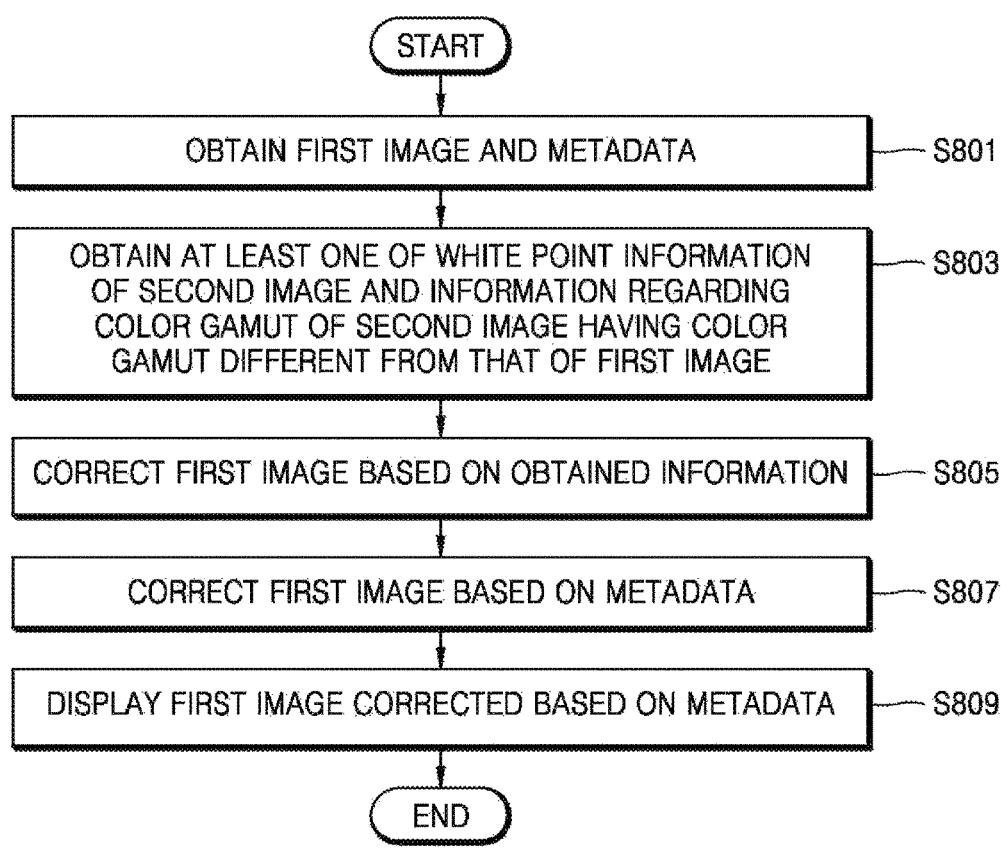
FIG. 8 is a flowchart illustrating a method of displaying a narrow gamut image based on metadata according to an exemplary embodiment.

FIG. 8 is a flowchart illustrating a method of displaying a narrow gamut image based on metadata according to an exemplary embodiment.

Referring to FIG. 8, in operation S801, the display device 700 may obtain a first image and metadata. The display device 700 may obtain the metadata for correcting color information of the first image.

In operation S803, the display device 700 may obtain at least one of white point information and color gamut information of a second image having a color gamut different from that of the first image. Also, in operation S805, the display device 700 may correct the first image based on at least one of the white point information and the color gamut information obtained in operation S803.

The correction of the first image based on the white point information may be performed after performing of operation S807.

In operation S807, the display device 700 may correct the first image based on the first image corrected in operation S803 and the metadata. The display device 700 may correct the first image by converting a brightness value of the first image into a corresponding brightness value of the second image based on information regarding a tone mapping correction function of the metadata. Also, the display device 700 may correct the first image by converting a saturation value of the first image to a corresponding saturation value of the second image based on information regarding a mapping function for each hue and each saturation gray scale of the metadata.

In operation S809, the display device 700 may display the first image corrected in operation S807. The display device 700 may have a display panel that may express colors existing on a relatively wide color gamut, and display the first image corrected to express colors of the wide color gamut.

According to an exemplary embodiment, the display device 700 may display a narrow gamut image to express colors of a wide gamut image based on narrow gamut image data and metadata even without wide gamut image data.

According to the above exemplary embodiments, the display device 700 corrects and displays an image based on the metadata, but is not limited thereto, and may display an image corrected by an external device. The display device 700 may receive a narrow gamut image corrected to express colors of a wide gamut image or a wide gamut image corrected to express colors of a narrow gamut image based on the metadata by the external device. The display device 700 may display the received image. When white point correction of the received image is required, the display device 700 may correct a white point of the received image and display the received image.

Figure 9:
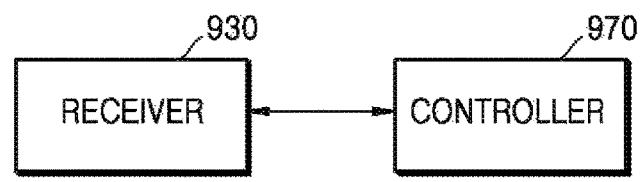
FIG. 9 is a block diagram illustrating an inner configuration of a device for generating metadata according to an exemplary embodiment.

FIG. 9 is a block diagram illustrating an inner configuration of a device for generating metadata according to an exemplary embodiment.

The device 900 may be a server device for generating metadata corresponding to an image.

The device 900 may include a receiver 930 and a controller 970.

The receiver 930 may obtain at least one of a first image and a second image respectively having different color gamut, white point information, and information regarding a color gamut of the second image.

The white point information and the information regarding the color gamut may be fixed values that may be determined depending on an image type. Therefore, the receiver 930 may obtain the white point information and the information regarding the color gamut by using type information of the first and second images.

The controller 970 may correct the first image based on the obtained information and generate metadata based on a correspondence relation between color information of the corrected first image and color information of the second image. The controller 970 may generate the metadata by obtaining a brightness value and a saturation value of the second image that correspond to a brightness value and a saturation value of the corrected first image.

The controller 970 may generate the metadata by obtaining a tone mapping correction function representing a brightness value of the second image that corresponds to a brightness value of the first image, and a mapping function for each hue and each saturation gray scale representing a saturation value of the second image that corresponds to a saturation value of the first image.

Figure 10:
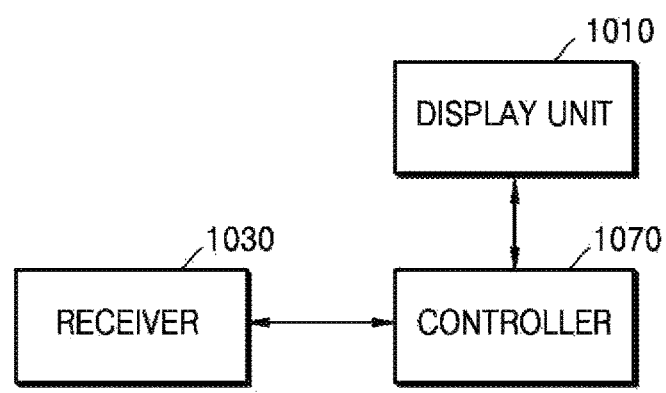
FIG. 10 is a block diagram illustrating an inner configuration of a display device 1000 for displaying an image based on metadata according to an exemplary embodiment.

FIG. 10 is a block diagram illustrating an inner configuration of a display device for displaying an image based on metadata according to an exemplary embodiment.

The display device 1000 may be a device having a display panel that may be manipulated by a user. For example, the display device 1000 may be a smart television (TV), a ultra high definition (UHD) TV, a monitor, a personal computer (PC), a notebook computer, a mobile phone, a tablet PC, a navigation terminal, a smartphone, a personal digital assistant (PDA), a portable multimedia player (PMP), and a digital broadcasting receiver.

The display device 1000 may include a receiver 1030, a controller 1070, and a display unit 1010.

The receiver 1030 may obtain at least one of white point information and information regarding a color gamut of a second image, a first image, and metadata. The white point information and the information regarding the color gamut of the second image may be obtained depending on an image type of the second image, for example, image type information such as an Adobe RGB image and a DCI image. The white point information and the information regarding the color gamut depending on the image type may be fixed values. Therefore, the receiver 1030 may obtain the white point information and the information regarding the color gamut depending on each image type.

The controller 1070 may correct the first image based on at least one of the white point information and the information regarding the color gamut obtained by the receiver 1030. Also, the controller 1070 may correct colors of the corrected first image based on the metadata. The metadata may include information regarding a correspondence relation between brightness values and saturation values of the first image and the second image. The controller 1070 may correct the brightness value and the saturation value of the first image based on the metadata.

The display unit 1010 may display the first image corrected by the controller 1070. The first image may be corrected by the controller 1070 so that the first image may be expressed in colors of the second image. The display unit 1010 may have a display panel that may express a color gamut of the second image as well as a color gamut of the first image.

According to an exemplary embodiment, the display device may correct a narrow gamut image to express colors of a wide gamut image and display the corrected narrow gamut image by using the metadata.

The methods according to some exemplary embodiments may be embodied in the form of program commands executable through various computer means, which may be recorded on a computer-readable recording medium. The computer-readable recording medium may include program commands, data files, and data structures either alone or in combination. The program commands recorded on the computer-readable recording medium may be those that are especially designed and configured for the inventive concept, or may be those that are known and available to computer programmers skilled in the art. Examples of the computer-readable recording medium include magnetic recording media such as hard disks, floppy disks, and magnetic tapes, optical recording media such as CD-ROMs and DVDs, magneto-optical recording media such as floptical disks, and hardware devices such as ROMs, RAMs, and flash memories that are especially configured to store and execute program commands. Examples of the program commands include machine language codes that may be generated by a compiler, and high-level language codes that may be executed by a computer by using an interpreter.

Though the description has been made with an emphasis on new characteristics of the inventive concept that are applied to various exemplary embodiments, those of ordinary skill in the art would understand that various deletions, replacements, and changes may be possible in form and details of the described device and method without departing from the spirit and scope of the following claims. Therefore, the scope of the inventive concept is defined by the following claims rather than the above description. All modifications within equivalents of the claims are included in the scope of the inventive concept.

The invention claimed is:

1. A method of generating metadata, the method comprising:
    obtaining a first image and a second image respectively having different color gamuts;
    obtaining at least one of information regarding a white point of the second image and information regarding the color gamut of the second image;
    correcting the first image based on the obtained information;
    generating metadata based on a correspondence relation between color information of the corrected first image and color information of the second image; and
    displaying image based on the generated metadata,
    wherein the generating of the metadata comprises:
    obtaining a brightness value of at least one pixel of the first image;
    obtaining a brightness value of a pixel of the second image that corresponds to the at least one pixel of the first image; and
    generating the metadata based on a brightness value of a pixel of the second image that corresponds to a brightness value of each pixel of the first image.

2. The method of claim 1, wherein the correcting of the first image comprises:
    converting a color coordinate of a white point of the first image based on a color coordinate of the white point of the second image; and
    correcting the first image based on the converted color coordinate of the white point of the first image.

3. The method of claim 2, wherein the correcting of the first image comprises:
    after correcting the first image based on the converted color coordinate of the white point of the first image, mapping the color gamut of the first image to the color gamut of the second image; and
    correcting the first image based on the mapped color gamut of the first image.

4. The method of claim 1, wherein the generating of the metadata based on the brightness value comprises:
    obtaining a function representing the brightness value of the second image that corresponds to the brightness value of the first image based on the obtained brightness values of the first and second images;
    correcting the function such that the obtained function has a form of a linear function; and
    generating the metadata based on the corrected function.

5. The method of claim 1, wherein the generating of the metadata comprises:
    obtaining a saturation value of at least one pixel of the first image;
    obtaining a saturation value of a pixel of the second image that corresponds to the at least one pixel; and
    generating the metadata based on a saturation value of the second image that corresponds to a saturation value of each pixel of the first image.

6. The method of claim 5, wherein the generating of the metadata based on the saturation value comprises:
    obtaining a function representing a saturation value of the second image that corresponds to a saturation value of the first image for each of at least one hue; and
    generating the metadata based on the function.

7. The method of claim 1, wherein the obtaining of the first image and the second image comprises:
    matching the first image with the second image by scaling or cropping the first image and the second image.

8. A non-transitory computer-readable recording medium having recorded thereon a program for implementing the method of claim 1.

9. A method of displaying a first image based on metadata, the method comprising:
    obtaining the first image and the metadata;
    obtaining at least one of information regarding a white point of a second image having a color gamut different from that of the first image, and information regarding the color gamut;
    correcting the first image based on the obtained information;
    correcting the corrected first image based on the metadata; and
    displaying the first image corrected based on the metadata.

10. The method of claim 9, wherein the correcting of the first image based on the obtained information comprises:
    converting a color coordinate of a white point of the first image based on a color coordinate of the white point of the second image; and
    correcting the first image based on the converted color coordinate of the white point of the first image.

11. The method of claim 10, wherein the correcting of the first image based on the obtained information comprises:
    after correcting the first image based on the converted color coordinate of the white point of the first image, mapping the color gamut of the first image to the color gamut of the second image; and
    correcting the first image based on the mapped color gamut of the first image.

12. The method of claim 9, wherein the correcting of the first image based on the metadata comprises:
    correcting the first image by converting a brightness value of at least one pixel of the first image based on the metadata.

13. The method of claim 12, wherein the correcting of the first image comprises:
    obtaining a brightness value of the second image that corresponds to the brightness value of the at least one pixel of the first image based on the metadata, and converting the brightness value of the at least one pixel based on the obtained brightness value.

14. The method of claim 9, wherein the correcting of the first image based on the metadata comprises:
- obtaining a saturation value of at least one pixel of the first image; and
- correcting the first image by converting the saturation value of the at least one pixel based on the metadata.

15. The method of claim 14, wherein the correcting of the first image comprises:
- converting the saturation value of the at least one pixel based on a function representing a saturation value of the second image corresponding to a saturation value of the first image for each of at least one hue.

16. A non-transitory computer-readable recording medium having recorded thereon metadata for correcting a first image, wherein the metadata comprises:
- information regarding a brightness value of a second image that corresponds to a brightness value of the first image corrected based on at least one of information regarding a white point and information regarding a color gamut of the second image; and
- information regarding a saturation value of the second image that corresponds to a saturation value of the corrected first image.

\* \* \* \* \*